(12) United States Patent
Strobl

(10) Patent No.: US 10,095,777 B1
(45) Date of Patent: *Oct. 9, 2018

(54) SEARCH LIFT REMARKETING

(71) Applicant: Google LLC, Mountain View, CA (US)

(72) Inventor: Reto Strobl, Walenstadt (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/794,884

(22) Filed: Oct. 26, 2017

Related U.S. Application Data

(63) Continuation of application No. 15/401,635, filed on Jan. 9, 2017, now Pat. No. 9,830,382, which is a continuation of application No. 14/075,674, filed on Nov. 8, 2013, now Pat. No. 9,569,502.

(51) Int. Cl.
*G06F 17/30* (2006.01)
*H04L 29/08* (2006.01)
*H04L 29/06* (2006.01)

(52) U.S. Cl.
CPC .. *G06F 17/30675* (2013.01); *G06F 17/30867* (2013.01); *H04L 67/32* (2013.01); *H04L 67/42* (2013.01)

(58) Field of Classification Search
CPC ................................................ G06F 17/30867
See application file for complete search history.

(56) References Cited

U.S. PATENT DOCUMENTS

| | | | |
|---|---|---|---|
| 6,496,804 B2 | 12/2002 | McEvoy et al. | |
| 7,343,390 B2 | 3/2008 | Cohen | |
| 7,747,465 B2 | 6/2010 | Srinivasan et al. | |
| 8,539,067 B2 | 9/2013 | Juda | |
| 8,725,723 B2 | 5/2014 | Kim | |
| 2002/0103698 A1 | 8/2002 | Cantrell | |
| 2008/0195476 A1 | 8/2008 | Marchese et al. | |
| 2009/0012848 A1 | 1/2009 | Brooks | |

(Continued)

OTHER PUBLICATIONS

Display Advertising Impact: Search Lift and Social InB02uence 17th ACM SIGKDD Conference on Knowledge Discovery and Data Mining (KDD), Aug. 21-24, 2011 Panagiotis Papadimitriou, et al. http://ilpubs.stanford.edu/993/2/displayadinfluenceTR.pdf Stanford Univ. & Yahoo Labs.

(Continued)

*Primary Examiner* — Kris E Mackes
(74) *Attorney, Agent, or Firm* — Fish & Richardson P.C.

(57) ABSTRACT

Aspects and implementations of the present disclosure are directed to methods of and systems for search lift remarketing. In general, in some implementations, a first content item is distributed to client devices and search lift attributable to the first content item is measured by examining subsequent requests received from client devices to which the first content item has been distributed as compared to requests received from similar client devices to which the first content item has not been distributed. Keywords benefiting from search-lift attributable to the first content item are used to determine when to send a second content item in response to requests from client devices in a select audience. In some implementations, requests are compared to identify a set of keywords invoked more frequently after presentation of the first content item where an increase in usage exceeds a threshold or otherwise indicates a statistical significance.

20 Claims, 6 Drawing Sheets

(56) References Cited

U.S. PATENT DOCUMENTS

2009/0063250 A1 3/2009 Burgess
2013/0204700 A1 8/2013 Synett et al.

OTHER PUBLICATIONS

Remarketing Case Study: Benchmark Report on Achieving B2B Remarketing Success by Optimizing Brand Lift, White Paper, Apr. 2013 Irene Devos [?] http://irenedevos.com/remarketing-case-study-fluke-white-paper/Advantage Business Media.

SEARCH LIFT REMARKETING

CROSS-REFERENCE TO RELATED APPLICATIONS

This application is a continuation application of, and claims priority to, U.S. patent application Ser. No. 15/401,635, titled "Search Lift Remarketing," filed on Jan. 9, 2017, which is a continuation application of, and claims priority to, U.S. patent application Ser. No. 14/075,674, titled "Search Lift Remarketing," filed on Nov. 8, 2013. The disclosure of the foregoing applications are incorporated herein by reference in their entirety for all purposes.

BACKGROUND

An information network, e.g. the Internet (or more particularly the World Wide Web hosted thereon), facilitates delivery of content from content providers to content recipients. A content provider, e.g., a person or company, may provide content for display on a web page or other document. Presentation of the content may include text, video, audio, an interactive element, and/or any combination thereof. The presentation may include content from multiple content providers. For example, the presentation may include third party advertisements displayed on a web page together with information from another content provider. A person viewing a web page rendered by a client device may see content from multiple providers in a single web page or during a single web browsing session.

In addition to presenting content, web pages may also be used to submit information or queries to data servers. An example is a user-entered search for information. A user's search may invoke keywords indicating the user's interests. Content providers may wish to identify a set of keywords and to associate a particular content item with the set of keywords for delivery to the user.

SUMMARY

Aspects and implementations of the present disclosure are directed to methods of and systems for search lift remarketing. In general, in some implementations, a first content item is distributed to client devices and search lift attributable to the first content item is measured by examining subsequent requests received from client devices to which the first content item has been distributed as compared to requests received from similar client devices to which the first content item has not been distributed. Keywords benefiting from search-lift attributable to the first content item are used to determine when to send a second content item in response to requests from client devices in a select audience. In some implementations, requests are compared to identify a set of keywords invoked more frequently after presentation of the first content item where an increase in usage exceeds a threshold or otherwise indicates a statistical significance.

In one aspect a method of conducting a search-lift remarketing campaign includes causing, by a campaign server, a first content item to be transmitted to a first plurality of client devices. The method includes comparing, by the campaign server, a first plurality of requests received from one or more client devices in the first plurality of client devices after transmission of the first content item with a second plurality of requests received from one or more client devices in a second plurality of client devices that have not received the first content item and identifying a set of one or more keywords invoked in the first plurality of requests more frequently than in the second plurality of requests based on the comparing. The method includes determining, by the campaign server, that a request from a third client device invokes one or more of the identified set of keywords and that the third client device is qualified to receive a second content item and causing the second content item to be transmitted to the third client device, responsive to the request from the third client device.

In some implementations of the method, causing the first content item to be transmitted comprises issuing an instruction for a content server to transmit the first content item. In some implementations of the method, causing the first content item to be transmitted comprises sending the client device an instruction to request the first content item from a content server. In some implementations of the method, causing the first content item to be transmitted comprises transmitting the first content item, e.g., via a data network. In some implementations of the method, causing the first content item to be transmitted is responsive to receiving a request from a client device in the first plurality of client devices, the request satisfying one or more conditions for receipt of the first content item. Conditions for receipt of the first content item may be any condition used to identify when to transmit the first content item to a client device. For example, the request may invoke a keyword indicating interest in the first content item. Generally, upon receiving a request from a hold-back client device in the second plurality of client devices, even a request otherwise satisfying the one or more conditions for receipt of the first content item, the campaign server does not cause the first content item to be transmitted to the hold-back client device. Some implementations of the method include randomly selecting a client device for inclusion in the second plurality of client devices.

In some implementations of the method, comparing the first plurality of requests with the second plurality of requests comprises identifying a search term received in a request from at least one client device in the first plurality of client devices, measuring a first frequency for receipt of the search term from client devices in the first plurality of client devices, and measuring a second frequency for receipt of the search term from client devices in the second plurality of client devices. In some implementations of the method, comparing the first plurality of requests with the second plurality of requests comprises identifying a keyword invoked by a request received from at least one client device in the first plurality of client devices, measuring a first frequency for receipt of requests from client devices in the first plurality of client devices invoking the keyword, and measuring a second frequency for receipt of requests from client devices in the second plurality of client devices invoking the keyword. In some implementations of the method, the keyword is invoked by one or more request terms. The request terms may be substantially similar terms, different grammatical forms of the same term, synonymous terms, or otherwise related. In some implementations, a keyword is a pattern invoked by terms or phrases satisfying the pattern.

In some implementations of the method, identifying, by the campaign server, the set of one or more keywords invoked in the first plurality of requests more frequently than in the second plurality of requests based on the comparing comprises measuring a first frequency for receipt of requests from client devices in the first plurality of client devices invoking a keyword, measuring a second frequency for receipt of requests from client devices in the second plurality of client devices invoking the keyword, and determining that the first frequency exceeds the second frequency. Determining that the first frequency exceeds the second frequency can comprise determining that the first frequency exceeds the second frequency by at least a statistically significant level. Determining that the first frequency exceeds the second frequency can comprise determining that the first frequency exceeds the second frequency by at least a threshold value. The threshold value can be preconfigured. The threshold value can be relative to other keyword comparisons.

In some implementations of the method, determining, by the campaign server, that a request from a third client device invokes one or more of the identified set of keywords comprises identifying a keyword satisfied by the request. In some implementations of the method, the third client device is qualified to receive the second content item when the third client device has previously received the first content item. In some implementations of the method, the third client device is qualified to receive the second content item when the third client device is in a remarketing campaign audience. In some implementations of the method, determining that the third client device is in a remarketing campaign audience comprises determining that the client device has been previously used to indicate an interest in the first content item. In some implementations of the method, any client device to which the first content item has been transmitted is automatically in the remarketing campaign audience and can receive the second content item.

In one aspect, a system for conducting a remarketing campaign comprises a network interface and one or more processors communicatively coupled to the network interface. The one or more processors are configured to cause a first content item to be transmitted to a first plurality of client devices. The one or more processors are configured to perform operations to compare a first plurality of requests received from one or more client devices in the first plurality of client devices after transmission of the first content item with a second plurality of requests received from one or more client devices in a second plurality of client devices that have not received the first content item and identify a set of one or more keywords invoked in the first plurality of requests more frequently than in the second plurality of requests based on the comparing. The one or more processors are configured to perform operations to determine that a request from a third client device invokes one or more of the identified set of keywords and that the third client device is qualified to receive a second content item and cause the second content item to be transmitted to the third client device, responsive to the request from the third client device.

In some implementations of the system, the one or more processors are configured to cause the first content item to be transmitted by issuing an instruction for a content server to transmit the first content item. In some implementations of the system, the one or more processors are configured to cause the first content item to be transmitted by sending the client device an instruction to request the first content item from a content server. In some implementations of the system, the one or more processors are configured to cause the first content item to be transmitted by causing the first content item to be transmitted comprises transmitting the first content item, e.g., via a data network. In some implementations of the system, the one or more processors are configured to cause the first content item to be transmitted responsive to receiving a request from a client device in the first plurality of client devices, the request satisfying one or more conditions for receipt of the first content item. Conditions for receipt of the first content item may be any condition used to identify when to transmit the first content item to a client device. For example, the request may invoke a keyword indicating interest in the first content item. Generally, upon receiving a request from a hold-back client device in the second plurality of client devices, even a request otherwise satisfying the one or more conditions for receipt of the first content item, the one or more processors do not cause the first content item to be transmitted to the hold-back client device. Some implementations of the system include randomly selecting a client device for inclusion in the second plurality of client devices.

In some implementations of the system, the one or more processors are configured to perform operations to compare the first plurality of requests with the second plurality of requests by identifying a search term received in a request from at least one client device in the first plurality of client devices, measuring a first frequency for receipt of the search term from client devices in the first plurality of client devices, and measuring a second frequency for receipt of the search term from client devices in the second plurality of client devices. In some implementations of the system, the one or more processors are configured to compare the first plurality of requests with the second plurality of requests by identifying a keyword invoked by a request received from at least one client device in the first plurality of client devices, measuring a first frequency for receipt of requests from client devices in the first plurality of client devices invoking the keyword, and measuring a second frequency for receipt of requests from client devices in the second plurality of client devices invoking the keyword. In some implementations of the system, the keyword is invoked by one or more request terms. The request terms may be substantially similar terms, different grammatical forms of the same term, synonymous terms, or otherwise related. In some implementations, a keyword is a pattern invoked by terms or phrases satisfying the pattern.

In some implementations of the system, the one or more processors are configured to perform operations to identify the set of one or more keywords invoked in the first plurality of requests more frequently than in the second plurality of requests by measuring a first frequency for receipt of requests from client devices in the first plurality of client devices invoking a keyword, measuring a second frequency for receipt of requests from client devices in the second plurality of client devices invoking the keyword, and determining that the first frequency exceeds the second frequency. Determining that the first frequency exceeds the second frequency can comprise determining that the first frequency exceeds the second frequency by at least a statistically significant level. Determining that the first frequency exceeds the second frequency can comprise determining that the first frequency exceeds the second frequency by at least a threshold value. The threshold value can be preconfigured. The threshold value can be relative to other keyword comparisons.

In some implementations of the system, the one or more processors are configured to perform operations to determine that a request from a third client device invokes one or more of the identified set of keywords by identifying a keyword satisfied by the request. In some implementations of the system, the third client device is qualified to receive the second content item when the third client device has previously received the first content item. In some implementations of the system, the third client device is qualified to receive the second content item when the third client device is in a remarketing campaign audience. In some implementations of the system, the one or more processors are configured to determine that the third client device is in a remarketing campaign audience by determining that the client device has been previously used to indicate an interest in the first content item. In some implementations, any client device to which the first content item has been transmitted is automatically in the remarketing campaign audience and can receive the second content item.

In one aspect, tangible computer readable storage media stores non-transient processor-executable instructions that, when executed by a server comprising the storage media and one or more processors, cause the one or more processors to perform the operations of conducting a remarketing campaign. The instructions cause the one or more processors to cause a first content item to be transmitted to a first plurality of client devices. The instructions cause the one or more processors to perform operations to compare a first plurality of requests received from one or more client devices in the first plurality of client devices after transmission of the first content item with a second plurality of requests received from one or more client devices in a second plurality of client devices that have not received the first content item and identify a set of one or more keywords invoked in the first plurality of requests more frequently than in the second plurality of requests based on the comparing. The instructions cause the one or more processors to perform operations to determine that a request from a third client device invokes one or more of the identified set of keywords and that the third client device is qualified to receive a second content item and cause the second content item to be transmitted to the third client device, responsive to the request from the third client device.

In some implementations of the storage media, the instructions cause the one or more processors to cause the first content item to be transmitted by issuing an instruction for a content server to transmit the first content item. In some implementations of the storage media, the instructions cause the first content item to be transmitted by sending the client device an instruction to request the first content item from a content server. In some implementations of the storage media, the instructions cause the first content item to be transmitted by causing the first content item to be transmitted comprises transmitting the first content item, e.g., via a data network. In some implementations of the storage media, the instructions cause the first content item to be transmitted responsive to receiving a request from a client device in the first plurality of client devices, the request satisfying one or more conditions for receipt of the first content item. Conditions for receipt of the first content item may be any condition used to identify when to transmit the first content item to a client device. For example, the request may invoke a keyword indicating interest in the first content item. Generally, upon receiving a request from a hold-back client device in the second plurality of client devices, even a request otherwise satisfying the one or more conditions for receipt of the first content item, the instructions do not cause the first content item to be transmitted to the hold-back client device. Some implementations include instructions for randomly selecting a client device for inclusion in the second plurality of client devices.

In some implementations of the storage media, the instructions cause the one or more processors to perform operations to compare the first plurality of requests with the second plurality of requests by identifying a search term received in a request from at least one client device in the first plurality of client devices, measuring a first frequency for receipt of the search term from client devices in the first plurality of client devices, and measuring a second frequency for receipt of the search term from client devices in the second plurality of client devices. In some implementations of the storage media, the instructions cause the one or more processors to compare the first plurality of requests with the second plurality of requests by identifying a keyword invoked by a request received from at least one client device in the first plurality of client devices, measuring a first frequency for receipt of requests from client devices in the first plurality of client devices invoking the keyword, and measuring a second frequency for receipt of requests from client devices in the second plurality of client devices invoking the keyword. In some implementations, the keyword is invoked by one or more request terms. The request terms may be substantially similar terms, different grammatical forms of the same term, synonymous terms, or otherwise related. In some implementations, a keyword is a pattern invoked by terms or phrases satisfying the pattern.

In some implementations of the storage media, the instructions cause the one or more processors to perform operations to identify the set of one or more keywords invoked in the first plurality of requests more frequently than in the second plurality of requests by measuring a first frequency for receipt of requests from client devices in the first plurality of client devices invoking a keyword, measuring a second frequency for receipt of requests from client devices in the second plurality of client devices invoking the keyword, and determining that the first frequency exceeds the second frequency. Determining that the first frequency exceeds the second frequency can comprise determining that the first frequency exceeds the second frequency by at least a statistically significant level. Determining that the first frequency exceeds the second frequency can comprise determining that the first frequency exceeds the second frequency by at least a threshold value. The threshold value can be preconfigured. The threshold value can be relative to other keyword comparisons.

In some implementations of the storage media, the instructions cause the one or more processors to perform operations to determine that a request from a third client device invokes one or more of the identified set of keywords by identifying a keyword satisfied by the request. In some implementations of the system, the third client device is qualified to receive the second content item when the third client device has previously received the first content item. In some implementations of the system, the third client device is qualified to receive the second content item when the third client device is in a remarketing campaign audience. In some implementations of the storage media, the instructions cause the one or more processors to determine that the third client device can receive the second content item. For example, the instructions cause the one or more processors to determine if the third client device is in a remarketing campaign audience, e.g., by determining that the client device has been previously used to indicate an interest in the first content item. In some implementations, any client device to which the first content item has been transmitted is automatically in the remarketing campaign audience and can receive the second content item.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

Figure 1:
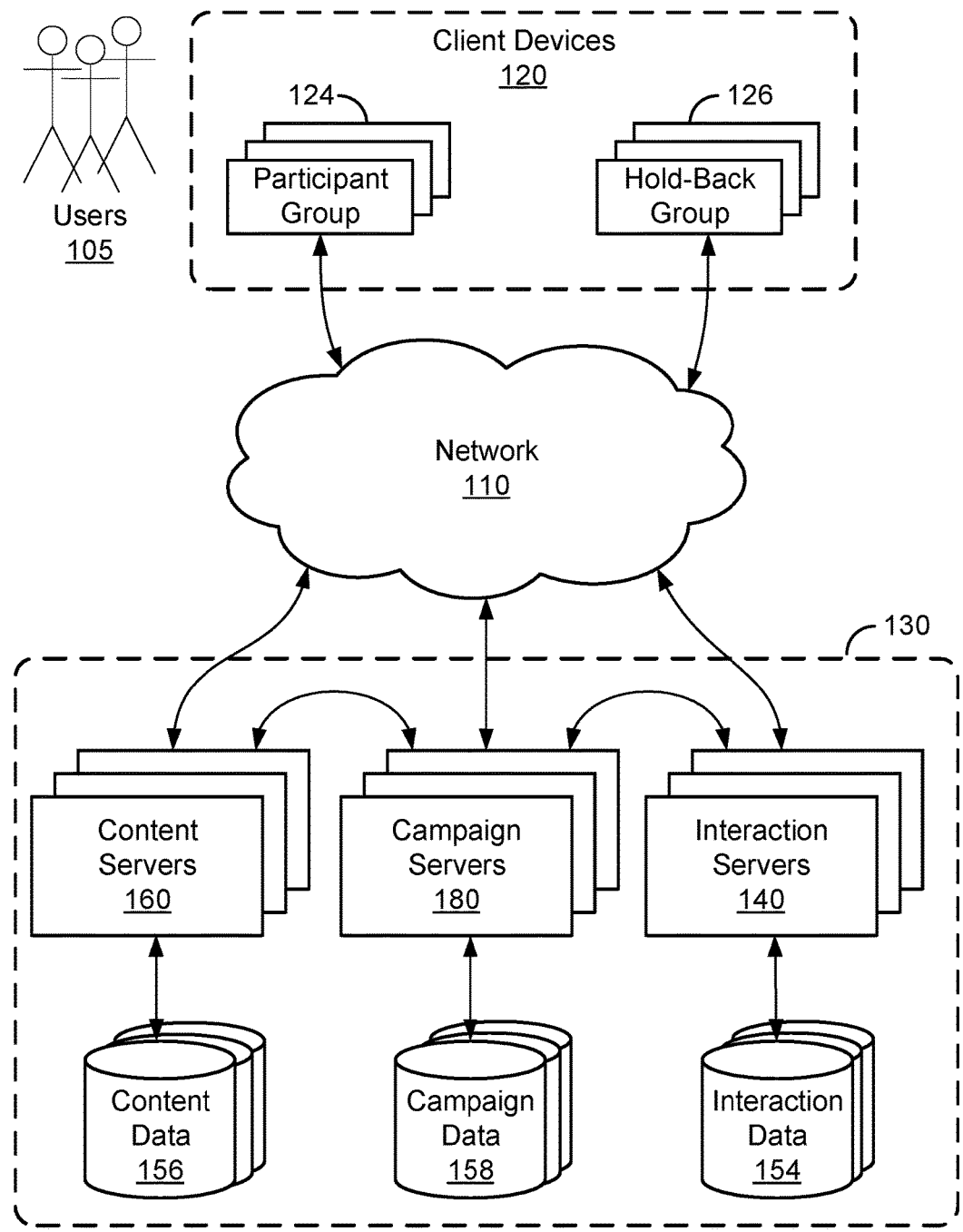
FIG. 1 is a block diagram of an example of an implementation of a system configuration consistent with the disclosed methods and systems.

Implementations described generally related to methods and systems for search lift remarketing. People may search for content in an information network environment using search terms. A person may be inspired to use a particular search term (or set of search terms) by information the person has previously received. For example, a person who has been made aware of a particular brand name may search for the particular brand name or for terms related to the brand name. An advertiser may structure an advertising campaign to inspire people to search for such terms. As a result of such a campaign, which may be referred to as a branding campaign, some search terms may be used more frequently by people who have seen content from the campaign, as compared to people who have not seen the content. These terms thus benefit from search-lift caused by the branding campaign.

An advertiser may wish to structure a second advertising campaign for delivery to people who search for the terms benefiting from the search-lift. An advertising campaign intended specifically for an audience of people who have interacted with the advertiser or the subject of the branding campaign, e.g., by visiting a related web page, may be referred to as a remarketing campaign. For example, a computer user may visit an e-commerce web site and place a product in an e-commerce shopping cart, but then abandon the transaction. The e-commerce web site may want to present the user with an advertisement for the product to encourage the user to resume the abandoned transaction. Other scenarios may also call for a remarketing campaign. For example, a user may search for and locate a movie preview trailer (e.g., on a video sharing website) and a remarketing campaign may later remind the user to purchase tickets for the movie when the movie is released to theaters. A remarketing campaign may be associated with particular keywords. Related content items, e.g., advertisements, may be presented to the user of a client device within the desired audience for the remarketing campaign when the user interacts with a website and invokes the particular keywords. In some implementations, a remarketing campaign is associated with keywords benefiting from search-lift from a previous campaign, e.g., a branding campaign. In some implementations, the remarketing campaign audience members have seen content from the branding campaign. In some implementations, the keywords benefiting from search-lift are identified automatically.

Generally, a search lift remarketing campaign is a remarketing campaign tied to keywords identified as benefiting from search lift generated by a previous campaign. Keywords may be predicted to benefit and verified by comparing searches by the campaign audience as compared to searches by a similar audience held back from the campaign. In some implementations, all searches by the two groups are compared to identify keywords used more frequently by the campaign audience then their held back peers. When a member of the remarketing audience uses one of these keywords in a subsequent search, they may be selected for receipt of additional content, e.g., for a remarketing campaign. The identification of keywords and the selection of audience members for the remarketing campaign may be automated or controlled by one or more campaign servers.

Referring to FIG. 1, illustrated is a block diagram of an implementation of a system configuration consistent with the disclosed methods and systems. A network 110 interconnects various client devices 120 with servers 130. The client devices 120 include devices forming a participant group 124 and devices forming a hold-back group 126. Users 105 operate the client devices 120, which interact with the servers 130 via the network 110, e.g., the Internet. For example, a user 105 may operate a client device 120 to interact with one or more interaction servers 140, which access interaction data stored in a data storage system 154. The client device 120 may receive one or more content items from content servers 160, which access content data stored in a data storage system 156. Campaign servers 180 assist in determining what content items are delivered to the client device 120 using campaign data stored in a data storage system 158. The user 105 views, and possibly interacts with, content received at the client device 120.

The network 110 is a network facilitating the interactions between computing devices, e.g., between the client devices 120 and the servers 130. An illustrative network 110 is the Internet; however, other networks may be used. The network 110 may be composed of multiple connected sub-networks. The network 110 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The network 110 may be any type and/or form of data network and/or communication network. The network 110 may be public, private, or a combination of public and private networks. The topology of the network 110 may be any network topology capable of the operations described herein. The network 110 is used to convey information between a server 130 and a client device 120.

A client device 120 is capable of exchanging information with the network 110. A client device 120 may be a computing device or software executing on a computing device. Generally, and without limitation, a client device 120 is capable of presenting, or facilitating presentation of, content to a user 105. A user 105 may operate a client device 120 to interact with various data servers 130 via the network 110. As an illustrative example, a user 105 may search for content using a client device 120, such that the search is received and processed by one or more interaction servers 140 and the sought-for content is delivered from one or more content servers 160 via the network 110 to the client device 120, where it is presented to the user 105. The delivered content may be the sought-for content accompanied by third-party content, e.g., a content item selected by a campaign server 180. Illustrative examples of client devices 120 include, but are not limited to, a laptop, desktop, tablet, electronic pad, personal digital assistant, smart phone, video game device, television, kiosk, or portable computer.

A sub-set of the of the client devices 120 forms a group of participant devices 124. Client devices 120 in the group of participant devices 124 receive content items reserved to the group. The reserved content item, or items, is distributed only to client devices 120 that are members of the group of participant devices 124. In some implementations, the reserved content item is an advertisement in a branding campaign. In some implementations, the reserved content item has a limited release.

Another sub-set of the of the client devices 120 forms a hold-back group of devices 126. Client devices 120 in the hold-back group 126 specifically do not receive the content items that are reserved to the group of participant devices 124. That is, client devices 120 that are members of the hold-back group 126 are held back from receiving the content items reserved to the group of participant devices 124.

The group of participant devices 124 and the hold-back group 126 may be formed in any manner. Membership in the group of participant devices 124 or in the hold-back group 126 may be determined at random. Membership in the group of participant devices 124 or in the hold-back group 126 may be determined based on one or more characteristics of the client devices 120 in the group. Characteristics may be related to geography, network connection provider, network connection type or quality, device type, day of the week, month, or year, time of day, past interactions, or any other characteristic information that may be available. In some implementations, the participant group 124 and the hold-back group 126 are composed of client devices 120 with similar characteristics. In some implementations, the participant group 124 and the hold-back group 126 are composed of client devices 120 operated by users 105 with similar characteristics, e.g., similar usage histories. In some implementations, membership in the group of participant devices 124 or in the hold-back group 126 is determined by randomly assigning each client device a unique identifier and including only those devices whose identifier satisfies some arbitrary test, e.g., that the identifier modulo x equals y. In some implementations, membership in the group of participant devices 124 or in the hold-back group 126 is determined in relation to a user of the device. In some implementations, the groups are formed and closed prior to delivering reserved content. In some implementations, membership in a particular group may be determined at any time. That is, a client device may be added to either group even after group specific events have occurred (e.g., client devices may be added to the participants group 124 after other devices in the group have already received a content item reserved to that group). In some implementations, group membership is determined by a data server 130, e.g., a campaign server 180.

A client device 120 in the group of participant devices 124 cannot concurrently be in the hold-back group 126. In some implementations, a client device 120 in the hold-back group 126 may be transferred out of the hold-back group 126 and into the group of participant devices 124.

A server 130 is capable of exchanging information with the network 110. A server 130 may be a computing device or software executing on a computing device. The computing device may be physical or virtual. Three distinct functional types of server 130 are illustrated in FIG. 1, interaction servers 140, content servers 160, and campaign servers 180. However, these functionalities may be combined in any manner, including, for example, as a single server handling all functions.

An interaction server 140 provides interactive services. Generally, a user 105 operates a client device 120 to submit requests to an interaction server 140. An interaction server 140 can host a search portal, e.g., for searching the World Wide Web for content. An interaction server 140 can host a usage-specific portal, e.g., a multi-media content host with an interface for discovering multi-media content. In general, an interaction server 140 receives a request from a client device 120 via the network 110. The request comprises terms used to determine a response to the request and the response is sent back to the client device 120. The response may be determined by an interaction server 140 or by an ancillary server, e.g., by a campaign server 180. The content of the response may be provided by an interaction server 140 or by a content server 160. The content of the response may be provided by multiple servers and may be provided by multiple functional types of servers.

For example, a user 105 uses a client device 120 to submit a search request to a search engine hosted by an interaction server 140. The interaction server 140 may provide a web-based interface to the search engine for searching an index stored in a data storage system 154. The interaction server 140 receives the search request from the client device 120, performs the requested search, and returns a result to the client device 120 via the network 110. The result may be accompanied by third-party content, e.g., content provided by one or more content servers 160. The interaction server 140 may respond to a request from a client device 120 with information directing the client device to content provided by the one or more content servers 160. For example, a web page may include elements that, when rendered at the client device 120, are satisfied by servers other than the server providing the main body of the web page.

Content servers 160 host and provide content items for distribution to client devices 120 via the network 110, generally using content data from data storage 156. Content servers 160 may serve text, audio, video, interactive, or multimedia content. Examples of content items that may be served up include news articles, corporate web pages, personal web pages, Blogs, music recordings, videos, games, advertisements, and any other content that can be distributed on the network 110. A single web page may include content provided from multiple content servers 160. In some implementations, a web page may include third party content.

The one or more campaign servers 180 control distribution of third party content. A campaign server 180 may include a rules engine that is used to determine if a particular scenario calls for distribution of a particular content item. Campaign servers 180 may exchange information with interaction servers 140 directly and/or via the network 110. Campaign servers 180 may exchange information with content servers 160 directly and/or via the network 110. Campaign servers 180 may rely on a storage system storing campaign data 158 in determining distribution of content items. In some implementations, the campaign servers 180 collect analytic data, e.g., from either or both of interaction servers 140 and content servers 160. For example, a campaign server 180 may record that a particular content item has been delivered by a content server 160 to a client device 120 in the group of participant devices 124. This information may be stored in the campaign data storage 158 and used in determining whether or not to deliver a second content item to the same client device 120.

Referring back to the interaction servers 140, the servers may receive, from a client device 120, a request comprising one or more request terms, e.g., search terms, that may invoke keywords associated with particular content. A keyword is invoked when a search term matches the keyword or is similar to the keyword. In some implementations, a keyword may include a pattern for matching terms, e.g., a regular expression. In some implementations, a keyword may be invoked by use of a synonym. In some implementations, content providers bid to have their respective content returned to a client device 120 submitting a request invoking particular keywords. The campaign servers 180 manage the bids in controlling distribution of third party content. Bids may be selected by a campaign server 180 at random or based on characteristics of the bid including, but not limited to, a relationship between the request terms used and the keyword invoked, a currency amount for the bid, a budget restriction associated with the bid or the content, a score value associated with the content, a time of day, or other characteristics of the request. Characteristics of the request include, for example, source of the request, time of day of the request, or past requests from the same client device.

As described, the various data servers 130 may access data stored by one or more storage devices, e.g., for interaction data 154, content data 156, or campaign data 158. Data storage devices may be volatile or non-volatile storage, hard drives, network attached storage, or storage area networks. Data storage devices may incorporate one or more mass storage devices for storing data, e.g., magnetic, magneto optical disks, or optical disks. Devices suitable for storing data include all forms of non-volatile memory, media and memory devices, including by way of example semiconductor memory devices, e.g., EPROM, EEPROM, and flash memory devices, magnetic disks, e.g., internal hard disks or removable disks, magneto optical disks, and CD ROM, DVD-ROM, and Blu Ray disks. Data storage devices may be virtualized. Data storage devices may be accessed by data servers via an intermediary server and/or via a network 110. Data storage devices may structure data as a database, e.g., as a relational database. Data storage devices may structure data as a collection of files, data blocks, or chunks. Data storage devices may provide for error recovery using, for example, redundant storage and/or error recovery data (e.g., parity bits).

Figure 2:
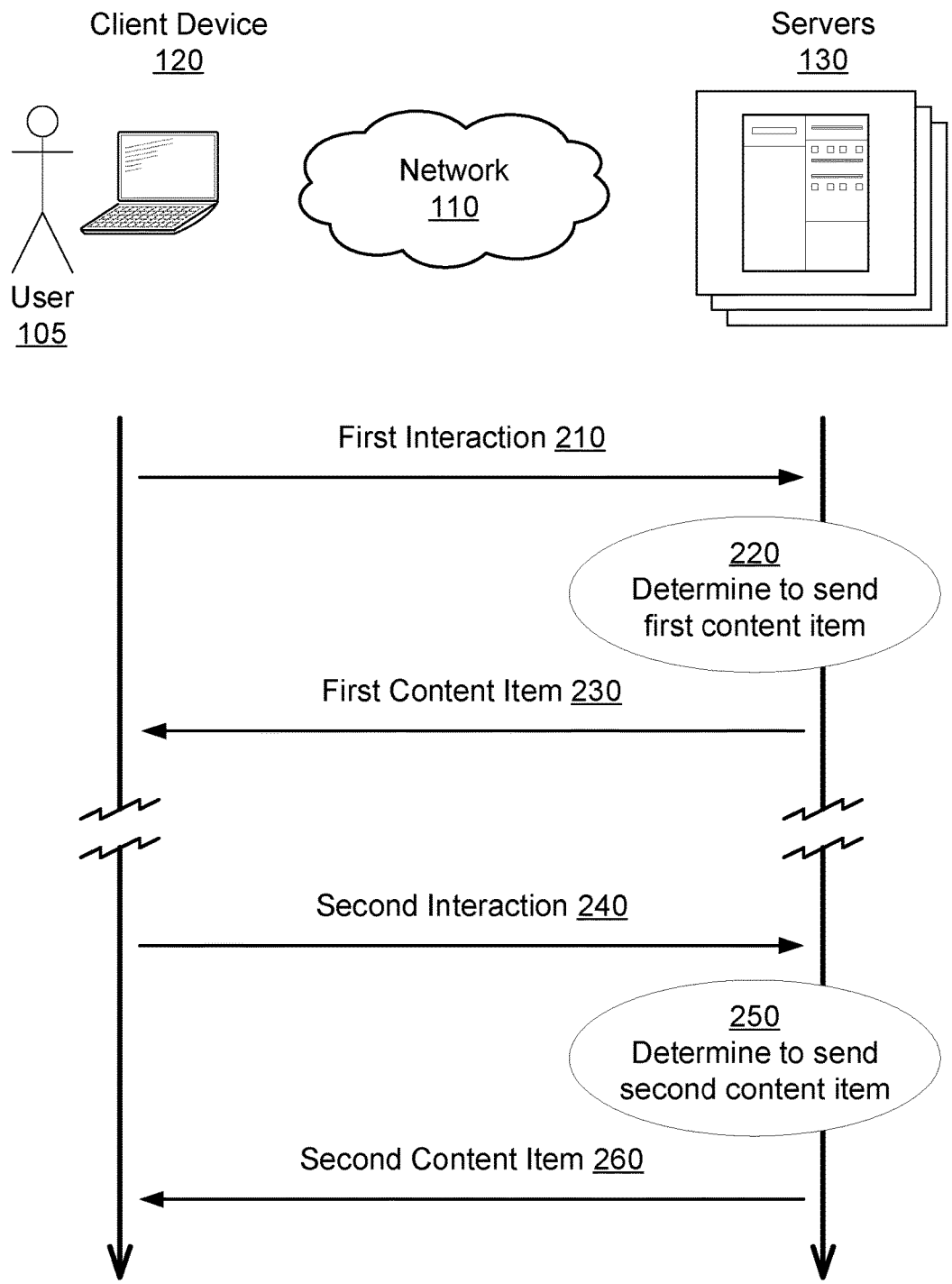
FIG. 2 is an illustration of an example client interaction.

FIG. 2 is an illustration of an example client interaction. A user 105 uses a client device 120 to exchange information with one or more servers 130 via the network 110. The illustrated exchange proceeds as a first interaction 210 causing a server 130 (e.g., a campaign server 180) to determine 220 to transmit a first content item 230 to the client device 120. A subsequent interaction 240 causes a server 130 (e.g., a campaign server 180) to determine 250 to transmit a second content item 260 to the client device 120. The determination 250 to transmit the second content item is driven, at least in part, by delivery of the first content item 230 and receiving the subsequent interaction 240.

The first interaction 210 is a communication from the client device 120 to a server 130 (e.g., an interaction server 140) via the network 110. The communication may be a request identifying specific content to be returned by a content server 160. The request may include one or more search terms. The communication may be a log-in event or a request for a portal or home page. The first interaction 210 may include information unique to the client device 120, e.g., address information, such as an IP address, or a randomly selected number previously assigned to the client device 120. For example, the client device 120 may store, e.g., as a "cookie," information containing the randomly assigned number and may return the number to the server 130 when requested. The randomly assigned number may be selected in a manner such that the number is only ever assigned to one device. The first interaction 210 may include information unique to the user 105 of the client device 120, e.g., account or log-in information such as a user ID or e-mail address.

A determination 220 is made at a server 130 (e.g., a campaign server 180) to send a first content item to the client device 120. The determination 220 is made responsive to the first interaction 210. In some implementations, the first content item is a reserved content item and is only sent to client devices 120 in the participant group 124. The determination 220 may include a determination that the client device 120 is in the participant group 124. The determination 220 may include a determination that the first interaction 210 satisfies a rule or condition for delivering the first content item. In some implementations, the rule or condition is stored as campaign data in a storage device 158.

The first content item is sent 230 to the client device 120, via the network 110, from a server 130 (e.g., a content server 160). The content item is presented by the client device 120 to the user 105. From the perspective of the user 105, the first interaction 210 results in delivery and presentation of the first content item 230. The user 105 may be unaware that the first content item 230 is reserved to a participating group of client devices 124. The user 105 may have specifically requested delivery of the first content item 230. The user 105 may have requested delivery of other content and the client device 120 may receive delivery of the first content item 230 concurrently with, or prior to, delivery of the other content requested.

The user 105 may initiate a second interaction 240 in response to delivery of the first content item 230. For example, the user 105 may be inspired to conduct a web search related to subject matter of the first content item. The first content item may be an advertisement that the user 105 can click on, or otherwise interact with, causing the client device 120 to request additional content, e.g., an advertiser web site. The user 105 may independently seek out a web site identified in the first content item. Generally, the second interaction 240 is related to delivery of the first content item 230. The second interaction 240 is subsequent to the first interaction 210 and receipt of the first content item 230. The second interaction 240 may be contemporaneous with, or temporally distant from, the first interaction 210 and/or receipt of the first content item 230.

A determination 250 is made at a server 130 (e.g., a campaign server 180) to send a second content item to the client device 120. The determination 250 is made responsive to the second interaction 240. The determination 250 may include a determination that the client device 120 is in the participant group 124. The determination 250 may include a determination that the second interaction 240 satisfies a rule or condition for delivering the first content item. In some implementations, the rule or condition is stored as campaign data in a storage device 158. In some implementations, the second content item is a reserved content item and is only sent to client devices 120 in the participant group 124. In some implementations, the second content item is sent to any client device 120, including devices in the participant group 124 and in the hold-back group 126.

In some implementations, the determination 250 is made based on characteristics of the second interaction 240. In some implementations, the determination 250 is made to send the second content when the second interaction 240 invokes one or more specific keywords. In some implementations, the one or more specific keywords are keywords that benefit from search-lift associated with delivery of the first content item 230. That is, the determination 250 to send the second content item may be made responsive to an interaction 240 that invokes one or more specific keywords benefiting from search-lift associated with delivery of the first content item 230. In some implementations, the determination 250 to send the second content item is responsive to both prior delivery of the first content item 230 and a subsequent second interaction 240 invoking one or more keywords benefiting from search-lift associated with delivery of the first content item 230.

The second content item is sent 260 to the client device 120, via the network 110, from a server 130 (e.g., a content server 160). The content item is presented by the client device 120 to the user 105. From the perspective of the user 105, the second interaction 240 results in delivery and presentation of the second content item 250. The user 105 may have requested delivery of other content and the client device 120 may receive delivery of the second content item 260 concurrently with, or prior to, delivery of the other content requested.

Generally, search-lift is caused by, or attributed to, an experience such as viewing the first content item 230. Search-lift is measured by comparing keyword usage by a first group of users (e.g., users of devices in the participating group 124) who have the shared experienced and a similar second group of users who do not (e.g., users of devices in the hold-back group 126). An increased use of a keyword by the first group after the experience, e.g., exposure to the first content item, that is not mirrored by the second group, is likely attributable to the shared experience. Search lift can be measured for specific keywords by comparing use of the specific keywords by users in the respective groups. Specific keywords benefiting from search lift can be identified by comparing all request terms received from client devices 120. For example, where users 105 access a search portal from their client devices 120, the users 105 submit search terms that may invoke particular keywords. If a search term is used more frequently by users after receiving a content item, the increased use is the search lift. Similar search terms, e.g., terms that differ only in conjugation or spelling, or terms that are synonyms, may invoke the same keyword. In some implementations, a keyword benefiting from any search-lift is used to determine 250 to send the second content. In some implementations, only keywords benefiting from search-lift above a threshold are used to determine 250 to send the second content. The threshold may be predefined in a campaign engine or rule used by a campaign server 180. In some implementations, the threshold is defined as a fixed level. In some implementations, the threshold is defined relative to other measurements, e.g., the N highest lifted terms or terms with a lift at least N % higher than the median lift.

Figure 3:
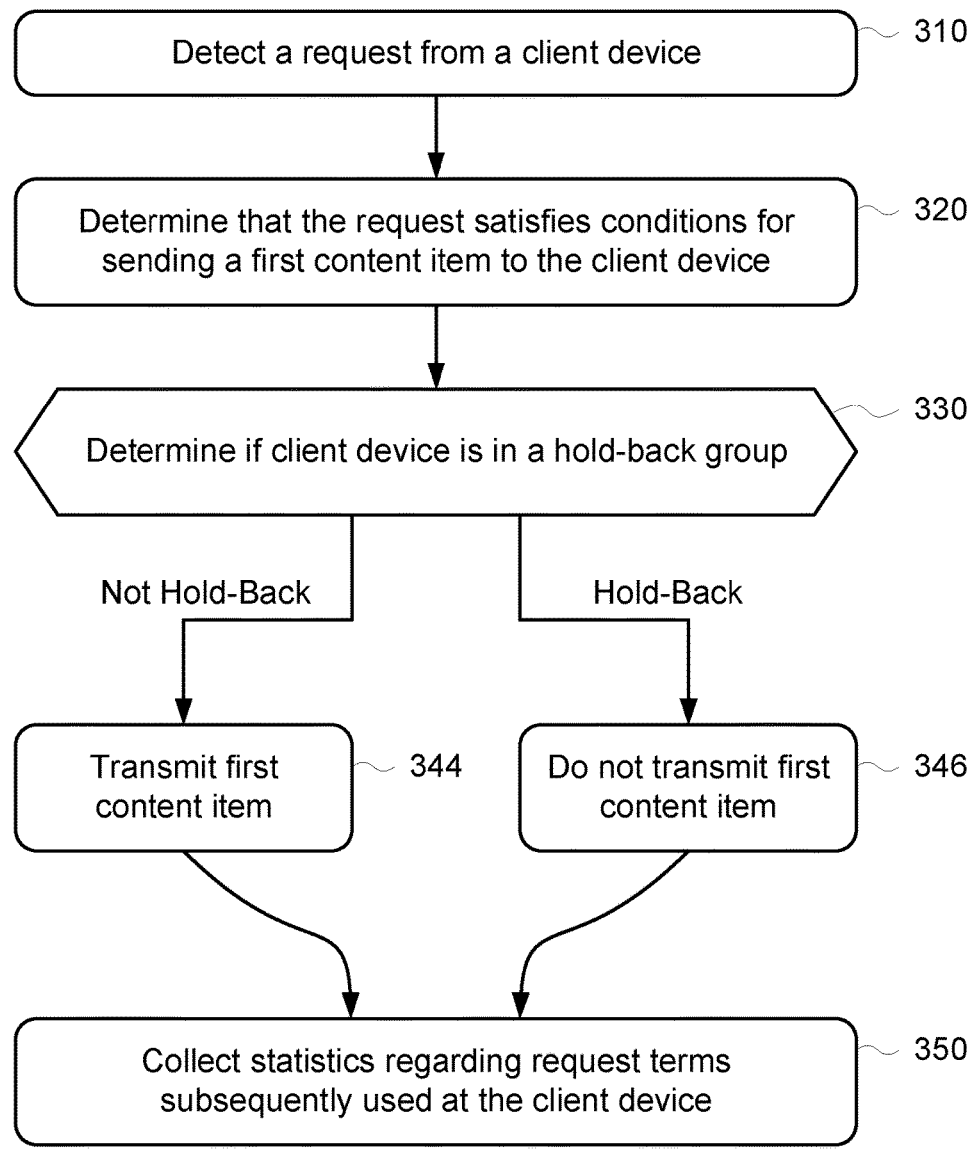
FIG. 3 is a flowchart illustrating an example collection of information for use in determination of search lift.

FIG. 3 is a flowchart illustrating collection of information for use in determination of keywords benefiting from search lift. In broad overview, the illustrated method begins with a server detecting a request from a client device (stage 310). A server determines that the request satisfies conditions for sending a first content item to the client device (stage 320). A server determines if the client device is in a hold-back group (stage 330). When the device is not in the hold-back group, a server transmits the first content item to the client device (stage 344). When the device is in the hold-back group, a server does not transmit the first content item to the client device (stage 346). The server may transmit an alternative content item to the client device. The servers collect statistics regarding search terms subsequently used at the client device (stage 350).

In more detail, at stage 310, a server 130 detects a request from a client device 120. Generally, the client device 120 submits the request to an interaction server 140 via the network 110. The interaction server 140 receives and process the request. In some implementations, the interaction server 140 forwards the request, or an indicator of the request, to a campaign server 180. In some implementations, the client 120 includes information in the request that can be used by a server 130 to recognize the client device 120. In some implementations, during a previous interaction, a server 130 provides the client with a unique number or character string to be stored by the client (e.g., as a cookie) and returned with future requests to the server. In some implementations, the server 130 uses the client device's IP address to recognize the client device 120. Other forms of recognition information may also be used, e.g., a user name or identity token. The request may be any form of request, including, for example, a search request at a search portal, a gateway request, or a request for specific content, e.g., an HTTP request for a particular web page or content item.

At stage 320, a server (e.g., the campaign server 180) determines that the request satisfies conditions for sending a first content item to the client device 120. The conditions may be anything used to determine to provide the first content item. Delivery may be associated with invocation of keywords. If a user 105 submits a request from a client device 120 invoking particular keywords, this may indicate that the particular content could be of interest to the user 105. Delivery may be conditioned on characteristics exhibited by the client device 120. Characteristics may include past usage history, time of day, day of week, day of month, day of year, geography, and/or destination of the request. In some implementations, the characteristic is a demographic characteristic. A search at an e-commerce website may be treated differently from the same search at a sports-news website. A search at a general world-wide web search portal may be treated differently depending on a previous search or time of day. Generally, a device with an event satisfying the conditions for presentation of a first content item to the client device places the client device within a group of client devices that have similarly demonstrated potential for delivery of the first content item.

At stage 330, a server (e.g., the campaign server 180) determines if the client device is in a hold-back group. At stage 320, the client device was identified as a potential candidate for receiving the first content item. However, search-lift is measured by comparing similar devices where the main distinction is exposure to the first content item. A number of devices that are candidates for receiving the first content item are therefor held back, thus enabling the comparison. In some implementations, a campaign server 180 makes the determination at stage 330. In some implementations, an interaction server 140 makes the determination at stage 330. In some implementations, the determination at stage 330 is made based on information provided by the client device 120, e.g., based on a number provided to the client device for return to the server. In some implementations, the determination at stage 330 is made at random, e.g., every $n^{th}$ client device is held back. In some implementations, the client device 120 stores information (e.g., in a cookie) that is presented to the server 130 in future interactions. In some implementations, the server 130 stores information for recognizing future interactions with the same client device 120.

At stage 344, when the device is not in the hold-back group, a server 130 transmits the first content item to the client device 120. In some implementations, a campaign server 180 determines that the client device should receive the first content item and causes the first content item to be transmitted to the client device 120. In some implementations, the campaign server 180 instructs a content server 160 to transmit the first content item to the client device. In some implementations, the interaction server 140 instructs the client device 120 to request the first content item from a content server 160. In some implementations, multiple content servers 160 transmit the first content item at stage 344. In general, the first content item is transmitted via a network 110 to the client device 120.

When a first content item is sent to a client device 120 at stage 344, a record of the transmission is made. In some implementations, a server may record information about the client device, e.g., in campaign data stored in a storage system 158 or in interaction data stored in a storage system 154, the recorded information indicating that the first content item has been sent to the client device. In some implementations, the recorded information is an identifier unique to the client device 120. In some implementations, the recorded information is the random number used at stage 330 to determine if the client device is in the participant group 124 or in the hold-back group 126. In some implementations, the server provides the client device additional information indicating that the client has received the first content item. For example, the client device may record a cookie indicating receipt of the first content item.

After stage 344, when the first content item has been sent to the client device 120, the client device 120 presents the content item to the user 105. Thus a user 105 of a client device 120 in a participating group 124 has an experience with the first content item and future interactions between the client device 120 and the servers 130 can be used in measuring search lift attributable to the first content item. A user 105 of a client device 120 in a hold-back group 126 generally does not have this experience.

At stage 346, when the device is in the hold-back group 126, a server does not transmit the first content item to the client device. That is, the first content item is reserved only to client devices not in the hold-back group. No content server 160 transmits the first content item to a client device 120 in a hold-back group 126. In some implementations, the server transmits an alternative content item to the client device. In some implementations, a bid process is used for selecting content items for delivery to the client device and the reserved content item is not entered into the bid process.

After stage 346, a user 105 of a client device 120 in a hold-back group 126 has not experienced the first content item and future interactions between the client device 120 and the servers 130 can be used in measuring absence of search lift.

At stage 350, the servers collect statistics regarding search terms subsequently used at the client device 120. Generally, this statistical information is collected for any device initiating a request that satisfied the initial conditions at stage 320, regardless of whether or not the client device was in the in the hold-back group, as determined at stage 330. The statistics collected are for terms used in interactions between the client devices 120 and the interaction servers 140. In some implementations, statistics are collected only for search terms used at the client devices 120 during a limited period of time, e.g., for a few hours, a few days, or a few weeks after the request detected at stage 310 or transmission of the first content item at stage 344. The statistical information is aggregated across all of the client devices 120 that satisfied the initial conditions at stage 320 and used to identify keywords benefiting from search lift.

Figure 4:
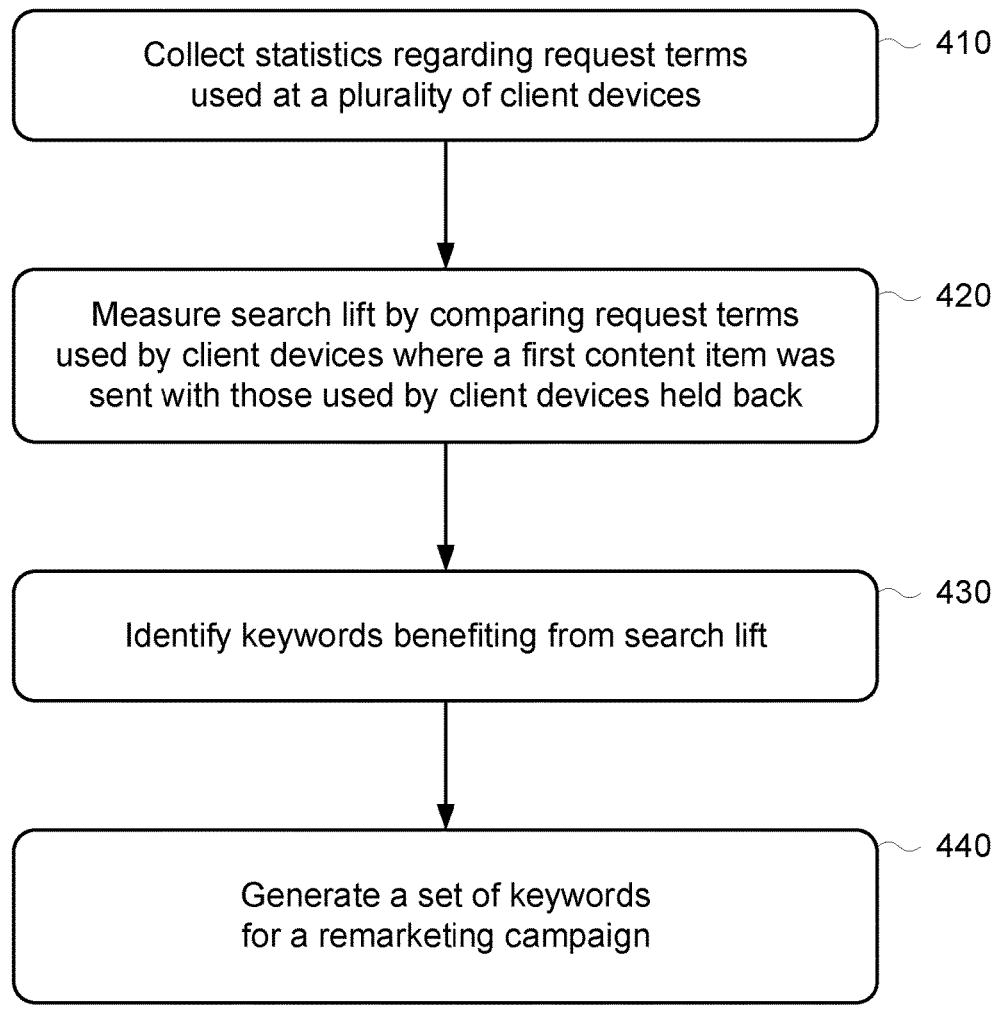
FIG. 4 is a flowchart illustrating an example use of collected information in forming a remarketing campaign.

FIG. 4 is a flowchart illustrating use of collected information in forming a remarketing campaign. In broad overview, one or more servers collect statistics regarding search terms used at a plurality of client devices (stage 410). The one or more servers compare request terms received from client devices where a first content item has been sent to the client device with request terms received from client devices held back from receiving the first content item (stage 420). Based on the comparison, the one or more servers identify keywords benefiting from search lift (stage 430) and the one or more servers generate a set of keywords for a remarketing campaign (stage 440).

In more detail, at stage 410, one or more servers collect statistics regarding search terms used at a plurality of client devices. Generally, stage 410 is an aggregation of stage 350 illustrated in FIG. 3, over a population of client devices 120. The statistical information is aggregated across all of the client devices 120 that satisfied the initial conditions at stage 310 and used in the analysis at stage 420 to identify keywords benefiting from search lift at stage 430. In some implementations, the analysis is performed offline and/or by one or more computing servers distinct from collection servers handling stage 410.

At stage 420, the one or more servers compare request terms received from client devices where a first content item has been sent to the client device with request terms received from client devices held back from receiving the first content item. Generally, similar request terms are grouped together as keywords invoked by the request terms. In some implementations, a keyword is a pattern satisfied by request terms matching the pattern. In some implementations, a keyword is invoked by terms synonymous with other terms invoking the keyword. Thus each usage of any variations on the same request term (e.g., singular and plural forms of a term or various synonyms for a term) each contribute to usage statistics for the same keyword. In some implementations, a server 130 reviews a transaction log of interactions with client devices 120 to identify request term usage statistics. In some implementations, interaction servers 140 store transaction logs as interaction data in a data storage system 154. In some implementations, a server 130 collects request term usage statistics as client devices 120 interact with interaction servers 140. In some implementations, a campaign server 180 conducts the statistical analysis.

At stage 430, the one or more servers identify keywords benefiting from search lift, based on the comparison at stage 420. Generally, as has been described, keywords invoked more frequently at client devices in the participating group 124 than at client devices in the hold-back group 126 are identified as benefiting from search lift. In some implementations, the difference in usage by the two groups must exceed a threshold. In some implementations, keywords are identified where the keyword is invoked frequently across a wide variety of contexts but has a measurable increase in usage by users of client devices that are in the participating group 124. That is, although a keyword is common and thus generally a poor indicator of interest, an increase use after presentation of the first content item may suggest value. In some implementations, search lift is measured for keywords predicted to benefit from search lift. In some implementations, search lift is measured for all keywords invoked by any request received from a client device in the participating group 124. In some implementations, there is a minimum usage of request terms invoking a keyword before the keyword is considered to benefit from search lift.

At stage 440, the one or more servers generate a set of keywords for a remarketing campaign based on the one or more search terms identified at stage 430. The keywords that benefit the most from search-lift associated with presentation of the first content item suggest a strong likelihood of identifying interactions demonstrating an interest in the subject matter of the first content item. The keywords may then be used to select client devices for receipt of the second content item. A search lift remarketing campaign may be created using a set of the keywords. In some implementations, the set of keywords is generated at stage 440 automatically, e.g., by a campaign server 180. In some implementations, the set of keywords are selected at stage 440 by an administrator or customer, e.g., an advertiser. In some implementations, keywords are included in the generated set of keywords when the difference in usage frequency between client devices in the participating group 124 and client devices in the hold-back group 126 exceeds a threshold. In some implementations, keywords included in the generated set of keywords are assigned a relative value for the search-lift benefit. That is, keywords in the set of keywords may have different search-lift benefit values that may be considered when determining to cause a second content item to be presented to a client device during a remarketing campaign.

A remarketing campaign generally has an intended audience (e.g., client devices that have received a first content item or demonstrated interest in the subject matter thereof), an associated set of keywords (e.g., the set of keywords generated in FIG. 4), and a second content item to be transmitted to members of the intended audience when they invoke one or more of the keywords in the associated set of keywords.

In some implementations, a client device 120 is automatically placed in a remarketing campaign audience when the first content item is sent to the client device 120. In some implementations, a client device 120 is placed in a remarketing campaign when the client device 120 interacts with the first content item (e.g., clicks on an advertisement). In some implementations, a client device 120 is placed in a remarketing campaign when the client device 120 interacts with a server associated with the subject matter of the first content item. For example, if the client device 120 is used to visit a web page for a product or service described by the first content item. In some implementations, all client devices are included in an audience for a remarketing campaign. In some implementations, another process is used to select client devices to be included in an audience for a remarketing campaign or a campaign administrator manually selects client devices to be included in an audience for a remarketing campaign.

Figure 5:
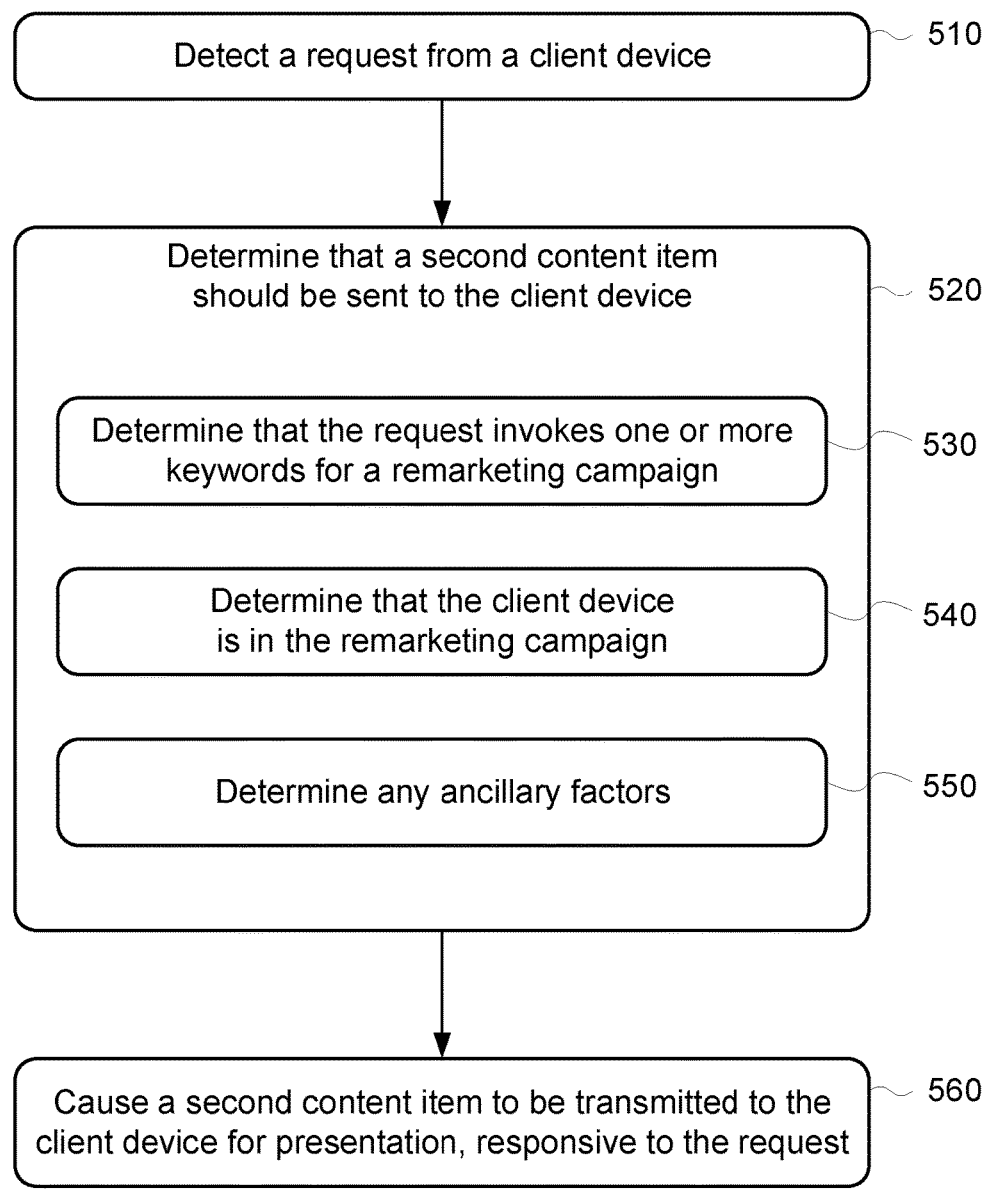
FIG. 5 is a flowchart illustrating an example of a determination to cause a content item to be presented to a client device.

FIG. 5 is a flowchart illustrating a determination to cause a content item to be presented to a client device. In broad overview, the method illustrated in FIG. 5 begins with a server detecting a request from a client device (stage 510). A server determines if a second content item should be sent to the client device (stage 520). The determination at stage 520 includes one or more iterations of determining that the request invokes one or more keywords for a remarketing campaign (stage 530), determining that the device is qualified to receive the second content item (stage 540), and determining any ancillary factors (stage 550). Based on the determinations of stage 520, and responsive to the request detected at stage 510, a server causes the second content item to be transmitted to the client device for presentation to a user (stage 560).

In more detail, at stage 510, a server 130 detects a request from a client device 120. Generally, the client device 120 submits the request to an interaction server 140 via the network 110. The interaction server 140 receives and process the request. In some implementations, the interaction server 140 forwards the request, or an indicator of the request, to a campaign server 180. In some implementations, the client 120 includes information in the request that can be used by a server 130 to recognize the client device 120. The request may be any form of request, including, for example, a search request at a search portal (such that the request terms may include search terms), a gateway request, or a request for specific content, e.g., an HTTP request for a particular web page or content item.

At stage 520, a server 130 (e.g., a campaign server 180) determines if a second content item should be sent to the client device 120. The determination at stage 520 includes one or more iterations of determining that the request invokes one or more keywords for a remarketing campaign (stage 530), determining that the device is qualified to receive the second content item (stage 540), and determining any ancillary factors (stage 550). In some implementations, a server first determines that the request invokes one or more keywords for the remarketing campaign (stage 530), and then determines if the client device is qualified to receive the second content item (stage 540). In some implementations, a server first determines if the client device is qualified to receive the second content item (stage 540) and then determines if the request invokes one or more keywords for the remarketing campaign (stage 530). In some implementations, the determinations at stage 520 are concurrent or substantially concurrent.

At stage 530, a server 130 determines that the request invokes one or more keywords for a remarketing campaign. In some implementations, the keywords in the remarketing campaign are generated as illustrated in FIG. 4 and described in reference thereto. The request may use one or more request terms, or search terms, that invoke one or more of the keywords in the set of keywords. In some implementations, an interaction server 140 receives the request and passes it to a campaign server 180, and the campaign server 180 performs the analysis. In some implementations, the interaction server 140 parses the request.

At stage 540, a server 130 determines that the device is qualified to receive the second content item. In some implementations, a client device must be in the remarketing campaign audience to be qualified to receive the second content item. In some implementations, the client device must have previously received the first content item to be qualified to receive the second content item. In some implementations, during a previous interaction, a server 130 provides the client with a unique number or character string to be stored by the client (e.g., as a cookie) and returned with future requests to the server. In some implementations, the server 130 uses the client device's IP address to recognize the client device 120. Other forms of recognition information may also be used, e.g., a user name or identity token. In some implementations, the client device 120 includes information in the request indicating that the client device 120 has previously received a first content item. Any such recognition data may be used, e.g., by a campaign server 180, to determine at stage 540 if the client device 120 submitting the request is within the remarketing campaign audience. In some implementations, the campaign server 180 obtains an identifier for the client device and the identifier is compared to data stored for the remarketing campaign. The data may be stored, e.g., as campaign data in a data storage system 158 or as interaction data in a data storage system 154.

At stage 550, a server 130 determines any ancillary factors for returning the second content item to a client device 120. Ancillary factors include, but are not limited to, any limitations on a number of times the second content item may be distributed, any limitations on a frequency for distributions of the second content item, any date or time preferences or restrictions for distributions of the second content item, and whether or not the client device has already received distribution of the second content item. In some implementations, the campaign server 180 runs an automated auction wherein a plurality of content items are each associated with keywords invoked by the request and compete to determine which content item is (or content items are) returned to the client device. Generally, each content item in the auction is associated with one or more keywords and has an auction score for return of the content item responsive to the one or more keywords invoked. The content items with the highest auction score are returned to the client device. The auction score may be a function of a bid value a third-party is willing to pay for placement of the content item in response to the keywords invoked by the interaction from the client device. The auction score may be a function of a bid value a third-party is willing to pay for placement of the content item in response to an interaction from a client device in similar or equivalent conditions. The auction score may be a function of a budget for how many bids a third-party may be willing to pay over a period of time. The auction score may be a function of a quality assessment assigned for the content item. The auction score may be a function of how good a particular keyword satisfied by the client device request is in comparison to other keywords. The auction score may be a function of a search-lift benefit value for the keywords invoked. In some implementations, the determination at stage 530 and at stage 540 may each independently increase a bid value for the second content to be presented in response to the keywords. That is, a keyword may receive a bid of X for the second content, but receive a higher bid of X+W when the keyword is invoked by a client device in the remarketing campaign audience, and keywords for the second content may have a bid of Y for any client device, but a higher bid of Y+Z for client devices within a remarketing campaign audience. The auction score may be a function of any combination of these factors. The content items with the highest auction score win the auction. At stage 550, any ancillary factor for returning the second content item to a client device 120 may include a requirement for the second content item to win an auction.

At stage 560, a server 130 causes a second content item to be transmitted to the client device for presentation to a user, responsive to the request detected at stage 510. In some implementations, a campaign server 180 determines in stage 520 that a client device 120 qualifies to receive the second content item and a content server 160 transmits the second content item to the client device 120. In some implementations a plurality of content items qualify to be returned to the client device and one is selected by a campaign server 180. In some implementations, a web page is returned to the client device that causes the client device 120 to retrieve the second content item.

Conducting a search-lift remarketing advertising campaign may include configuring a campaign server with a first content item and a second content item and configuring characteristics for when to deliver the first content item to a client device. The campaign server then measures search lift attributable to the first content item and identifies a set of keywords benefiting from search lift. The campaign server automatically identifies a remarketing audience based on client device interactions which may include delivery of the first content item or an interaction with the client device indicative of an interest in the subject matter of the first content item. The campaign server then automatically builds a search-lift remarketing campaign for the identified remarketing audience based on the identified set of keywords benefiting from search lift. In some implementations, the remarketing campaign is run after a predetermined or configured amount of time has lapsed since distribution of the first content item. In some implementations, the remarketing campaign is run during a period of time overlapping with distribution of the first content item. That is, the first content item may be distributed in a branding campaign and the second content item may be distributed in a remarketing campaign that begins before the branding campaign ends.

Figure 6:
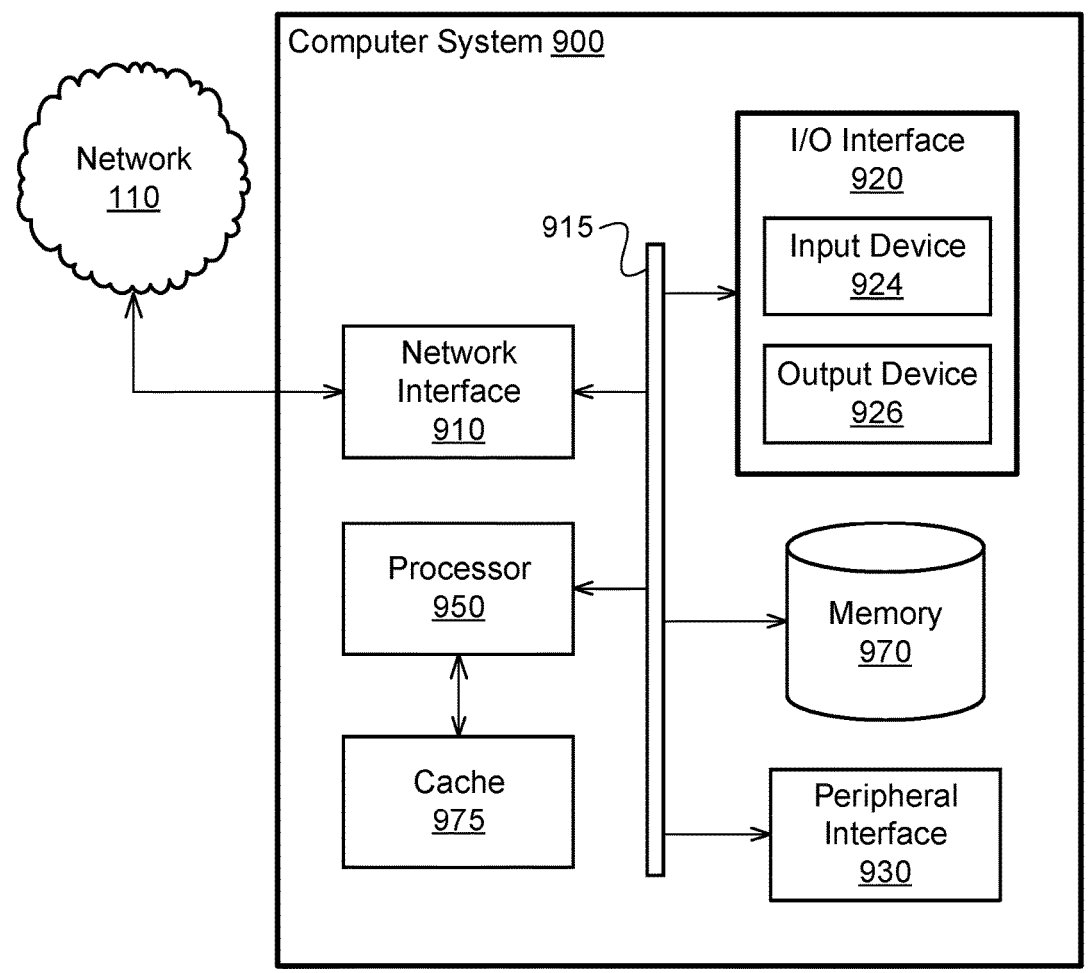
FIG. 6 is a block diagram of a computing system in accordance with an illustrative implementation.

FIG. 6 is a block diagram of a computing system 900 suitable for use in implementing the computerized components described herein. The essential elements of a computing system are a processor for performing actions in accordance with instructions and one or more memory devices for storing instructions and data. The illustrative computer system 900 includes one or more processors 950 in communication, via a bus 915, with one or more network interfaces 910 (in communication with the network 110), optional I/O interfaces 920 (e.g., for interacting with a user or administrator), and memory 970. Generally, a processor 950 will receive instructions and data from a read only memory or a random access memory or both. The processor 950 illustrated incorporates, or is directly connected to, additional cache memory 975. In some uses, additional components are in communication with the computer system 900 via a peripheral interface 930. In some uses, such as in a server context, there is no I/O interface 920 or the I/O interface 920 is not used. In some uses, the I/O interface 920 supports an input device 924 and/or an output device 926. In some uses, the input device 924 and the output device 926 are integrated into the same hardware, for example, as in a touch screen.

In some implementations, the client devices 120 illustrated in FIG. 1 are constructed to be similar to the computer system 900 of FIG. 9. For example, a user 105 interacts with an input device 924, e.g., a keyboard, mouse, or touch screen, at a client device 120 to access an interface, e.g., a web page, over the network 110. The interaction is received at the client device's network interface 910, and responses are output via an output device 926, e.g., a display, screen, touch screen, or speakers for presentation to the user 105.

In some implementations, one or more of the servers 130 illustrated in FIG. 1 are constructed to be similar to the computer system 900 of FIG. 9. In some implementations, a server 130 may be made up of multiple computer systems 900. In some implementations, a server may be a virtual server, for example, a cloud based server. A server 130 as illustrated in FIG. 1 may be made up of multiple computer systems 900 sharing a location or distributed across multiple locations. The multiple computer systems 900 forming a server may communicate using the user-accessible network 110. The multiple computer systems 900 forming a server may communicate using a private network, e.g., a data network distinct from the user-accessible network 110 or a virtual private network within the user-accessible network 110.

The processor 950 may be any logic circuitry that processes instructions, e.g., instructions fetched from the memory 970 or cache 975. In many implementations, the processor 950 is a microprocessor unit or any other processor capable of operating as described herein. The processor 950 may be a single core or multi-core processor. The processor 950 may be multiple processors.

The I/O interface 920 may support a wide variety of devices. Examples of an input device 924 include a keyboard, mouse, touch or track pad, trackball, microphone, touch screen, or drawing tablet. Example of an output device 926 include a video display, touch screen, speaker, braille terminal, inkjet printer, laser printer, dye-sublimation printer, or 3D printer. Examples of display devices include, but are not limited to, a CRT (cathode ray tube), LCD (liquid crystal display), LED (light emitting diode), OLED (organic LED), TFT (thin-film transistor), plasma, other flexible configuration, digital projector, or any other apparatus for displaying information, e.g., to a user. In some implementations, an input device 924 and/or output device 926 may function as a peripheral device connected via a peripheral interface 930.

A peripheral interface 930 supports connection of additional peripheral devices to the computing system 900. The peripheral devices may be connected physically, e.g., via FireWire or universal serial bus (USB), or wirelessly, e.g., via Bluetooth®. Examples of peripherals include keyboards, pointing devices, display devices, braille terminals, audio devices, hubs, printers, media reading devices, storage devices, hardware accelerators, sound processors, graphics processors, antennae, signal receivers, sensors, measurement devices, and data conversion devices. In some uses, peripherals include a network interface and connect with the computer system 900 via the network 110 and the network interface 910. For example, a printing device may be a network accessible printer.

The computer system 900 can be any workstation, desktop computer, laptop or notebook computer, server, blade, handheld computer, tablet, mobile telephone or other portable telecommunication device, media playing device, a gaming system, mobile computing device, or any other type and/or form of computing, telecommunications or media device that is capable of communication and that has sufficient processor power and memory capacity to perform the operations described herein.

Implementations of the subject matter and the operations described in this specification can be implemented in digital electronic circuitry, or in computer software recorded on a tangible medium, firmware, or hardware, including the structures disclosed in this specification and their structural equivalents, or in combinations of one or more of them. Implementations of the subject matter described in this specification can be implemented as one or more computer programs recorded on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

The terms "client" or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code recorded on a tangible medium that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-Ray® or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

Multiple kinds of devices can be used to provide for interaction with a user. For example, feedback provided to the user can be any form of sensory feedback, e.g., visual feedback, auditory feedback, or tactile feedback, and input from the user can be received in any form, including acoustic, speech, or tactile input. In addition, a computing system can interact with a user by sending documents to and receiving documents from a device that is used by the user, e.g., by sending webpages to a web browser on a user's client device in response to requests received from the web browser.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method, comprising:
   distributing a first portion of content to a first set of client devices;
   determining that, after the first portion of content is distributed to the first set of client devices, a particular search term is submitted by the first set of client devices more often than the particular search term is submitted by a second set of client devices that were not distributed the first portion of content;
   receiving, through a microphone of a client device, speech input that includes the particular search term;
   determining, by one or more computing devices, that a user of the client device was previously provided the first portion of content;
   determining, by the one or more computing devices, that the user of the client device is qualified to receive a second portion of content that is distributed to users that submit the particular search term after being provided the first portion of content based on the determination that the user of the client device was previously provided the first portion of content; and
   outputting, through a speaker of the client device, auditory feedback including the second portion of content to the user based on the determination that the user of the client device is qualified to receive the second portion of content.

2. The method of claim 1, wherein the client device is a personal digital assistant.

3. The method of claim 1, wherein the client device is a smart phone.

4. The method of claim 1, wherein the client device is a tablet device.

5. The method of claim 1, further comprising outputting visual information presented on a display device that is connected to the client device.

6. The method of claim 5, wherein the display device is wirelessly connected to the client device.

7. The method of claim 1, wherein determining that a particular search term is submitted by the first set of client devices more often than the second set of client devices comprises:
   measuring a first frequency of receipt of the particular search term from client devices in the first set of client devices;

measuring a second frequency of receipt of the particular search term from client devices in the second set of client devices;

comparing the first frequency to the second frequency and determining the first frequency exceeds the second frequency; and determining that the particular search term is submitted by the first set of client devices more often than the second set of client devices based on the comparison.

8. A system, comprising:

at least one processor; and a computer-readable medium coupled to the at least one processor having instructions stored thereon which, when executed by the at least one processor, cause the at least one processor to perform operations including:

distributing a first portion of content to a first set of client devices;

determining that, after the first portion of content is distributed to the first set of client devices, a particular search term is submitted by the first set of client devices more often than the particular search term is submitted by a second set of client devices that were not distributed the first portion of content;

receiving, through a microphone of a client device, speech input that includes the particular search term;

determining that a user of the client device was previously provided the first portion of content;

determining that the user of the client device is qualified to receive a second portion of content that is distributed to users that submit the particular search term after being provided the first portion of content based on the determination that the user of the client device was previously provided the first portion of content; and outputting, through a speaker of the client device, auditory feedback including the second portion of content to the user based on the determination that the user of the client device is qualified to receive the second portion of content.

9. The system of claim 8, wherein the client device is a personal digital assistant.

10. The system of claim 8, wherein the client device is a smart phone.

11. The system of claim 8, wherein the client device is a tablet device.

12. The system of claim 8, further comprising outputting visual information presented on a display device that is connected to the client device.

13. The system of claim 12, wherein the display device is wirelessly connected to the client device.

14. The system of claim 8, wherein determining that a particular search term is submitted by the first set of client devices more often than the second set of client devices comprises:

measuring a first frequency of receipt of the particular search term from client devices in the first set of client devices;

measuring a second frequency of receipt of the particular search term from client devices in the second set of client devices;

comparing the first frequency to the second frequency and determining the first frequency exceeds the second frequency; and determining that the particular search term is submitted by the first set of client devices more often than the second set of client devices based on the comparison.

15. A non-transitory computer readable medium storing instructions that, when executed by one or more computing devices cause the one or more computing devices to perform operations comprising:

distributing a first portion of content to a first set of client devices;

determining that, after the first portion of content is distributed to the first set of client devices, a particular search term is submitted by the first set of client devices more often than the particular search term is submitted by a second set of client devices that were not distributed the first portion of content;

receiving, through a microphone of a client device, speech input that includes the particular search term;

determining that a user of the client device was previously provided the first portion of content;

determining that the user of the client device is qualified to receive a second portion of content that is distributed to users that submit the particular search term after being provided the first portion of content based on the determination that the user of the client device was previously provided the first portion of content; and outputting, through a speaker of the client device, auditory feedback including the second portion of content to the user based on the determination that the user of the client device is qualified to receive the second portion of content.

16. The non-transitory computer readable medium of claim 15, wherein the client device is a personal digital assistant.

17. The non-transitory computer readable medium of claim 15 wherein the client device is a smart phone.

18. The non-transitory computer readable medium of claim 15, wherein the client device is a tablet device.

19. The non-transitory computer readable medium of claim 15, further comprising outputting visual information presented on a display device that is wirelessly connected to the client device.

20. The non-transitory computer readable medium of claim 15, wherein determining that a particular search term is submitted by the first set of client devices more often than the second set of client devices comprises:

measuring a first frequency of receipt of the particular search term from client devices in the first set of client devices;

measuring a second frequency of receipt of the particular search term from client devices in the second set of client devices;

comparing the first frequency to the second frequency and determining the first frequency exceeds the second frequency; and determining that the particular search term is submitted by the first set of client devices more often than the second set of client devices based on the comparison.

\* \* \* \* \*